Patented Feb. 24, 1953

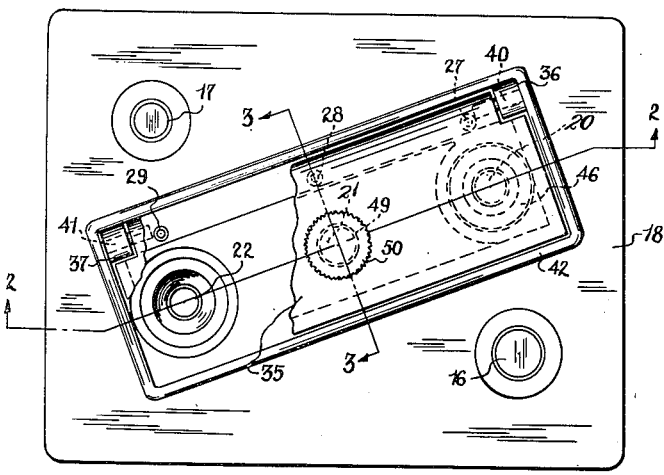

2,629,760

UNITED STATES PATENT OFFICE 2,629,760

HINGED MULTICELL COVER

Leland E. Wells, Cleveland Heights, and Robert M. Raney, Euclid, Ohio, assignors to Willard Storage Battery Company, Cleveland, Ohio, a corporation of West Virginia Application December 7, 1949, Serial No. 131,624

3 Claims. (Cl. 136—177)

The present invention relates to storage batteries and, more particularly, to multiple cell storage batteries of the so-called non-overfill or self-leveling type.

Non-overfill or self-leveling storage batteries of the multi-cell type generally have individual cell covers, each having a filling opening or well therein for replenishing the water lost by evaporation, gassing, etc., and a vent for permitting escape of gases generated during operation of the cell. The filling wells open into the cells at the maximum desired electrolyte level and below the level at which the vents communicate with the interiors of the cells. When water is to be added to the cells, the vents are first sealed and water is then introduced through the filling wells. The addition of water raises the electrolytic level until it reaches the lower ends of the wells and the air entrapped above the electrolyte prevents the addition of any substantial quantity of water and causes water being added to rise in the filling well, which calls the operator's attention to the fact that the cell is full, and thereby prevents overfilling of the cells. In the usual construction of storage batteries of the type referred to, the filling openings are tapped and have individual closure caps threaded thereinto and, when the cells are to be filled, the caps are removed and placed over and seal the vent openings. Alternate battery constructions have means other than the closure caps for sealing or closing the vent openings but, generally, it is necessary for the operator to individually seal the vents. Replenishing the cells of the batteries having the constructions described requires considerable care and is time consuming as the closure caps must be individually removed and replaced and the vents must be sealed and unsealed.

The principal object of the present invention is the provision of a new and improved, non-overfill or self-leveling multiple cell storage battery having a unitary cap or closure member for all of the filling openings which is movably attached to the battery so that the filling openings may be simultaneously closed and opened merely by moving the cap between two positions.

Another object of the invention is the provision of a new and improved, non-overfill or self-leveling multiple cell storage battery having a unitary cell cover for all of the cells and a unitary cap for all of the filling openings, which cap is movably attached to the cover for the battery cells so that the filling openings may be simultaneously closed and opened merely by moving the cap between two positions and which cap is so constructed and arranged that the vent openings are automatically closed and opened upon movement of the cap to open and close the filling openings.

The invention resides in certain constructions and combinations and arrangements of parts and further objects and advantages will be apparent to those skilled in the art to which it relates from the following description of the preferred embodiment described with reference to the accompanying drawings forming a part of this specification, in which Fig. 1 is an elevational plan view of a storage battery embodying the invention having the filling well cap partly removed;

Fig. 2 is a fragmentary sectional view taken substantially along line 2—2 of Fig. 1;

Fig. 3 is a fragmentary sectional view taken substantially along line 3—3 of Fig. 1 and on a larger scale; and Fig. 4 is a view similar to that of Fig. 3 but showing the filling well closure member in the open position.

The present invention is concerned with multiple cell storage batteries of the non-overfill or self-leveling type and contemplates the provision of such a battery having a unitary closure member or cap adapted to simultaneously open and close all of the filling openings of the battery, or, at least a plurality thereof, and to close or seal the vent openings of the cells when it is moved to the open position. In its preferred form, the battery has a unitary cover for all of the cells and the filling openings or wells and the vents for the cells are formed in the cover.

The invention is particularly applicable to automotive type, multi-cell, lead-acid storage batteries and is herein shown and described as incorporated in such a battery. Referring to the drawings, the storage battery shown has three cells and comprises an outer case 10 having three cell compartments 11, 12, 13 which are separated by partition walls 14, 15. The invention, however, may be embodied in batteries of more than three cells, or only two cells if desired. The cell elements, not shown, are of conventional construction and, in the present embodiment, internal inter-cell connectors are employed to connect the cell elements, the end terminals of which cells are connected with terminal posts 16, 17. It is to be understood, however, that external inter-cell connectors could be used, if desired. In the preferred form of the invention, the top walls of the cells comprise a single or unitary cell cover 18 suitably attached to and sealed with the casing 10 so as to prevent leakage of electrolyte.

The cell cover 18 has individual filling openings or wells 20, 21, 22 formed therein for each of the cell compartments 11, 12, 13 and( as is usual with non-overfill or self-leveling batteries, the lower ends of the wells terminate in the cell interiors at approximately the desired electrolyte level. Preferably, the filling wells 20, 21, 22 are arranged in a straight line diagonally of the length of the battery, as shown in Fig. 1, and the central well 21 is tapped as at 23.

The cell cover 18 also has vent openings 27, 28, 29, one communicating with each cell compartment and which openings are preferably arranged in a line parallel to the line of the filling wells. The vent openings are independent of the filling wells and communicate or open into the cell compartments above the level at which the filling wells open thereinto, as seen in Fig. 3. The vent openings are preferably shielded by a sleeve structure, one of which is seen at 30 in Fig. 3, and a baffle 31 is affixed in each sleeve to prevent splashing of the electrolyte through the vent openings. Each of the vent openings has a soft rubber grommet 32 therein which provides a relatively resilient, annular edge at the upper or outlet end of the vent.

The filling wells 20, 21, 22 are adapted to be closed by a unitary closure member or cap 35 which, in the embodiment of the invention shown, is generally rectangular and flat and is pivotally attached to the cell cover 18 to swing on an axis extending along one edge thereof. The cap 35 has recessed corner portions in its pivoted side, which portions receive lugs 36, 37 formed integral with the cell cover 18 and which lugs support pintle pins 40, 41 projecting therethrough and into cylindrical bearings in the cap. The pins 40, 41 form a pivot about which the cap 35 swings on an axis parallel to the center lines of the filling wells and vents. Preferably, the cover 18 has a recess in the area of the filling wells and vents and a flange formation 42 extends about the recess.

The underside of the cap 35 has annular bosses 43, 44, 45 which register with the openings surrounding the respective filling wells proper and each boss carries a relatively resilient, acid-resisting annular ring 46. The rings 46 are adapted to engage the top surface of the cell cover 18 and surround the upper edges of the filling wells and form, with the cap, sealing means for the filling wells. It is apparent from the foregoing that all of the filling wells can be uncovered or opened and covered or closed simultaneously merely by raising and lowering the cap 35 about its pivot.

Provision is made for attaching the cap in its closed position and to this end an opening 48 is formed therethrough concentric with the boss 44, and a member 49 is rotatably carried in the opening. The member 49 includes an external knob 50 having a stem projecting through the opening 48, which stem has a threaded portion 51 larger than the opening diameter and which is adapted to be threaded into the tapped opening 21. A sealing washer 52 is interposed between the knob and cap and by threading the stem portion 51 into the opening 21, the knob is drawn downwardly to clamp the cap to the cover.

The cap 35 is also provided with means for closing or sealing the vents 27, 28, 29 when it is raised to open the filling wells, and for opening the vents when moved to close the wells. In the preferred form of the invention, the pivoted edge of cap 35 has a cylindrical section formation 53 the axis of which coincides with the axis of the pivot pins 40, 41. The diameter of the cylindrical section is such that its surface is adapted to sealingly engage the upper ends of the rubber grommets 32 and due to the resilient character of the grommets, effect a gas tight seal at the vent outlets. Grooves, one of which is shown at 54, are formed in the cylindrical section 53 lying in planes normal to the axis of the cap pivot and are so located and are of such length that they register with and form outlets for the vent openings when the cap is in the position to close the filling wells, as seen in Fig. 3, but are moved out of registration with the vent openings to cause sealing of the vents when the cap is raised from the well openings, as seen in Fig. 4. It will be apparent that all of the vents are sealed to entrap air in the upper parts of the battery cell compartments when the filling wells are opened preparatory to adding water therethrough and when the wells are closed by the cap the vents are opened.

It is to be understood that the construction of the valve means for the vents may differ from that shown and described and any suitable valve structure may be employed. As an alternative construction, for example, the vents may comprise a resilient tube arranged to be pinched closed by the closure member when the latter is raised from the filling well openings.

While a preferred embodiment of the invention has been shown, it is our intention to cover all adaptations, modifications and changes therein which come within the practice of those skilled in the art to which the invention relates and the scope of the appended claims.

Having thus described our invention, we claim:

1. A storage battery comprising a plurality of cells, a unitary cover common to all of the cells, said cover having a filling opening and a vent opening communicating with the interior of each of the cells, said vent openings being above the level at which the filling openings communicate with the interior of the respective cells, and a unitary closure member, means pivotally attaching said closure member to said unitary cover, said closure member adapted to swing to and from all of said filling openings, the axis of the pivot for said closure member extending adjacent to the outlets of said vents, said member having arcuate portions whose centers are coincident with the pivot axis and which move to close said vent openings when said member is swung from said filling openings and move to open said vent openings when said member is swung to close said filling openings.

2. A storage battery comprising a plurality of cells, a unitary common cover for said cells, said cover having filling openings and vent openings communicating with the interiors of the respective cells, said vent openings communicating with the interior of the cells above the level at which the filling openings communicate therewith, a unitary closure member movably attached to the battery and adapted to move over all of the filling openings simultaneously to close the latter, valve means operatively associated with said closure member and actuated thereby to close and open said vents when said closure member is moved to open and close the filling openings respectively, and means to movably attach said unitary closure member to said common cover for movement to close and open the filling openings.

3. A storage battery comprising a plurality of cells, a unitary common cover for said cells, said cover having filling openings and vent openings communicating with the interiors of the respective cells, said vent openings communicating with the interior of the cells above the level at which the filling openings communicate therewith, a unitary closure member pivotally attached to the battery and adapted to move over all of the filling openings simultaneously to close the latter, valve means operatively associated with said closure member and actuated thereby to close and open said vents when said closure member is moved to open and close the filling openings respectively, and means to pivotally attach said unitary closure member to said common cover for movement to close and open the filling openings.

LELAND E. WELLS.
ROBERT M. RANEY.

REFERENCES CITED

The following references are of record in the file of this patent:

UNITED STATES PATENTS

| Number | Name | Date |
|---|---|---|
| 1,163,992 | Ford | Dec. 14, 1915 |
| 1,269,096 | Land | June 11, 1918 |
| 1,786,961 | Petrosky | Dec. 30, 1930 |
| 2,015,761 | Muro | Oct. 1, 1935 |
| 2,141,621 | Setzer | Dec. 27, 1938 |
| 2,220,005 | Smith | Oct. 29, 1940 |
| 2,281,800 | Riedesel | May 5, 1942 |
| 2,479,785 | Sievers | Aug. 23, 1949 |
| 2,506,952 | Doughty | May 9, 1950 |

FOREIGN PATENTS

| Number | Country | Date |
|---|---|---|
| 208,248 | Great Britain | Dec. 20, 1923 |
| 98,176 | Sweden | Feb. 27, 1940 |